A. A. LOW & H. HERTZBERG.
MEANS FOR PRELIMINARILY HEATING INTERNAL COMBUSTION ENGINES.
APPLICATION FILED NOV. 8, 1907.
1,029,380.
Patented June 11, 1912.
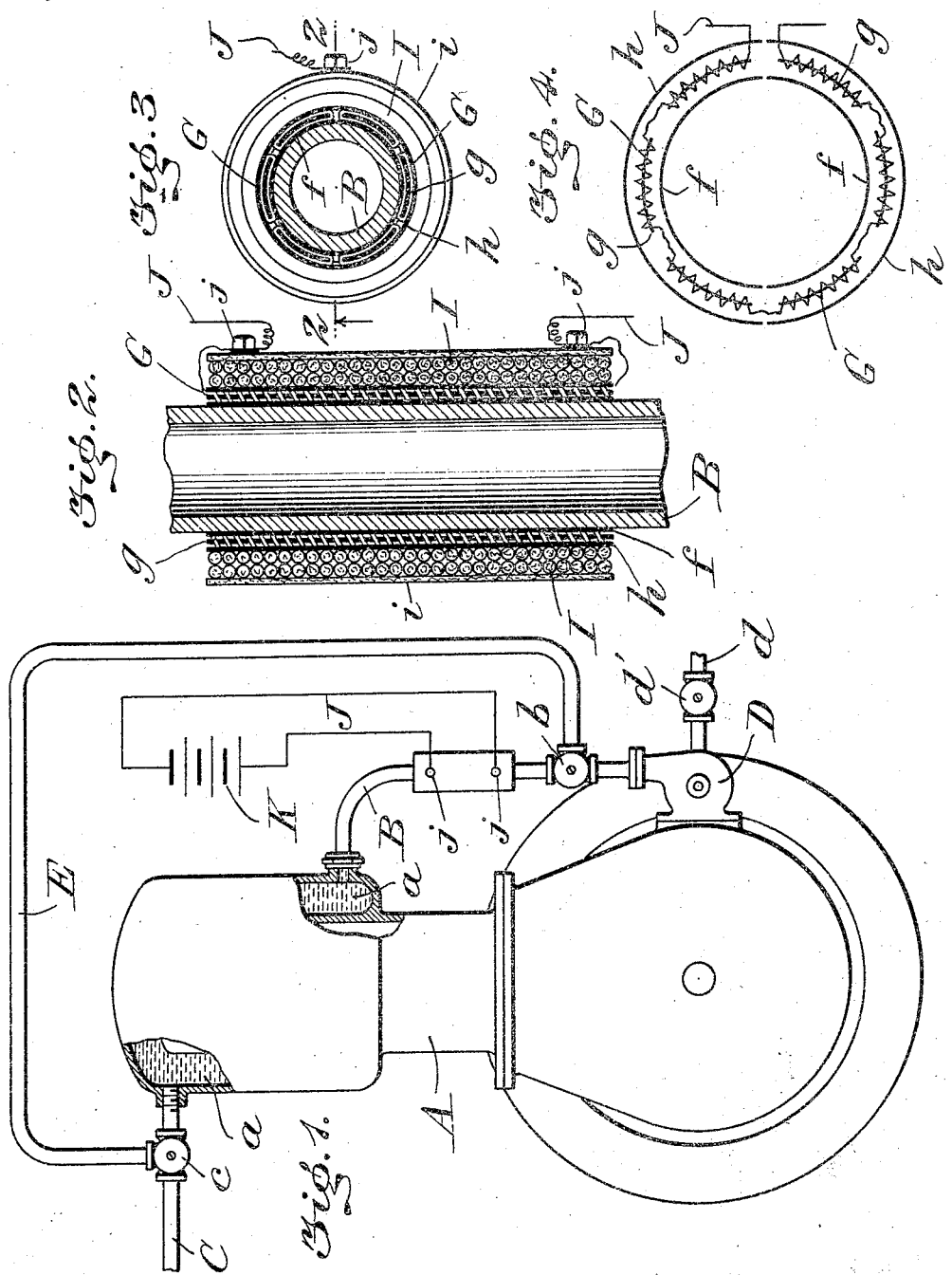
WITNESSES
H. C. Abbott
V. E. Nichols
INVENTORS
Abbot Augustus Low
Harry Hertzberg
BY
Griffins Pinchard
ATTORNEYS

UNITED STATES PATENT OFFICE.

ABBOT A. LOW, OF HORSESHOE, AND HARRY HERTZBERG, OF NEW YORK, N. Y.; SAID HERTZBERG ASSIGNOR TO SAID LOW.

MEANS FOR PRELIMINARILY HEATING INTERNAL-COMBUSTION ENGINES.

1,029,380.  Specification of Letters Patent.  Patented June 11, 1912.

Application filed November 8, 1907. Serial No. 401,239.

*To all whom it may concern:*

Be it known that we, ABBOT A. LOW and HARRY HERTZBERG, citizens of the United States, residing in Horseshoe, county of St. Lawrence, and State of New York, and New York, borough of Brooklyn, county of Kings, and State of New York, respectively, have invented certain new and useful Means for Preliminarily Heating Internal-Combustion Engines, of which the following is a specification.

The present invention consists of means for heating the cylinders, or other parts, of internal combustion engines preliminary to the operation of starting the same, or at the time of starting said engines; and it pertains more particularly to engines of that class which are adapted to be driven by kerosene as the fuel.

The value of kerosene as a fuel for the operation of explosive engines is well known, but great difficulty has been experienced in starting engines with a fuel of this nature. The difficulty is due, in some respects, to the fact that a vapor, charged with kerosene, when admitted to the cylinder, condenses upon contact with the cold walls of said cylinder. The difficulty is more apparent in cold weather, at which time the cylinders are in such a cold condition that it is necessary to heat the same by some means prior to starting the engine. Furthermore, when the engine is employed in a position exposed to the cold, the water or other cooling medium adapted to circulate in the jacket surrounding the cylinder is liable to be frozen. The present invention is designed, primarily, to remedy these objections, and to afford means by which the cylinder may be heated quickly and economically prior to, or at the time of, starting the engine.

Broadly stated, the invention comprises an electrically operated heating device associated with a circulating conduit or pipe adapted to supply a cooling medium, usually water, to the jacket of the engine cylinder, whereby the cooling medium (water) in said jacket may be brought to such a temperature as to heat that walls of the cylinder, or other parts of the engine.

In one practical embodiment of the invention, it embraces a plurality of electrically operated heating units applied externally to a water circulating pipe, said units being connected in series or in multiple in an electric circuit, whereby the heat developed in said units is adapted to be communicated to the circulating pipe and thence to the water adapted to be contained therein.

In our heating system provision is made, also, for the circulation of cold water through the cylinder jacket after the engine is started, whereby water is caused to absorb the heat and keep the engine at a proper working temperature.

In the accompanying drawings, we have illustrated one practical embodiment of the invention, but the construction shown therein is to be understood as illustrative, only, and not as defining the limits of the invention.

Figure 1 is an elevation representing an ordinary internal combustion engine equipped with our improvements. Fig. 2 is a longitudinal section through a portion of a water circulating pipe having our electrically-operated heater applied thereto. Fig. 3 is a plan view of said heater applied to the pipe, the latter being shown in cross section. Fig. 4 is a diagrammatic view of the electrical heater showing the insulations employed in connection therewith.

A designates an internal combustion engine of any approved type, but as hereinbefore indicated, it is preferred to use the invention in conjunction with an engine which is supplied with kerosene, the latter being mixed with air, said mixture of air and kerosene producing a combustible vapor which is supplied at the proper intervals to the engine. As is usual in the art, the engine cylinder is provided with a jacket adapted to provide a circulating chamber, *a*, for the cooling medium. To said jacket there is coupled an inlet pipe, B, adapted to supply water to the chamber, *a*. Another pipe, C, is coupled to the jacket on the opposite side thereof from the pipe, B, thus making provision for the circulation of water from one pipe, B, through the chamber, *a*, and out through the pipe, C. The water may be supplied in any way to the circulating chamber, *a*, but in Fig. 1, we have shown a common form of circulating pump, D, the latter being in communication with the pipe, B. Water is supplied to the pump from a tank or other suitable source by a pipe, $d$, said pipe having a suitable cock or valve, $d'$. The pipe, B, is provided with a suitable cock or valve, $b$, and similarly, the pipe, C, is provided with another cock or valve, $c$.

With the circulating pipes, B, C, there is associated a by-pass represented in Fig. 1 as a pipe, E, and when this by-pass is employed, it is preferred to make use of three-way cocks, $b$, $c$, the latter being adjustable to establish a circulation of water through the chamber, $a$, and the pipes, B, C, or around the by-pass, E, and through the chamber, $a$. It will be understood that when the engine is in operation and it is desired to circulate water around the cylinders for the purpose of absorbing some of the heat from said cylinders, the cocks, $b$, $c$, are adjusted to prevent the water from circulating through the by-pass, E, whereby the water may be drawn by the pump, D, through the pipe, $d$, and forced through the pipe, B, the chamber, $a$, and the pipe, C. Preliminary to starting the engine, however, the valves, $b$, $c$, may be adjusted to cut off the circulation of water from the pump, D, into the pipe, B, and out through the pipe, C, said valves bringing the by-pass, E, into the liquid circuit composing a part of the pipe, B, the chamber, $a$, a part of the pipe, C, and the by-pass, E, whereby the liquid is adapted to circulate through the by-pass E, and the chamber $a$.

In conjunction with one of the pipes, preferably the pipe, B, we employ an electrically-operated heater adapted to heat the liquid contained in said pipe. The electrically-operated heater is shown more clearly in Figs. 3 and 4 of the drawings, by reference to which it will be seen that said heater comprises a plurality of heating units applied externally to a part of said pipe, such as B, said heating units being connected in any desired way in an electric circuit, J, the latter being energized from any appropriate source or power, such as the battery, K. Each unit of the electric heater consists of a resistance coil, G, the same being represented as a metallic wire or ribbon which is wound on a layer or core, $g$, of insulating material, such as mica. A number of these heating units are laid, bent or otherwise applied externally to the metallic circulating pipe, B, said units being shown in Figs. 3 and 4 as arranged edge to edge around the pipe, each unit extending a suitable distance lengthwise of the pipe. The resistance coils of the units are represented in Fig. 4 as being connected in series, but the particular method of connecting said coils is not material, for the reason that said coils may be connected in multiple in the electric circuit, J. The metallic resistance coils are insulated electrically from metallic contact with the pipe, B, by one or more layers, $f$, composed of electrical insulating material, such as mica.

It is to be understood that in applying the electric heater to the pipe, B, the layer or layers, $f$, are first wound on or otherwise fitted to the pipe, B, the electric heating units or resistances, G, are then applied to the insulating layer or layers, $f$, and then another insulating layer or layers, $h$, composed of mica, are wound externally on or otherwise applied to the resistance coils or units, G.

The heating units and the insulating means therefor are confined in position and protected by an external packet or casing. Said casing is shown in Figs. 2 and 3 as consisting of a cord or strand of heat insulating material, such as asbestos, the same being wound in one, two or more layers externally of the insulating material, $h$, after which a winding of sheet asbestos, $i$, is applied to the cord or strand winding, I, the whole being suitably bound or held mechanically in place.

During the operation of assembling the several heating units or resistance coils, the proper electrical connections between said coils are made, and after the heat insulating layer or layers, I, $i$, are applied, the end resistance coils are properly connected with the binding posts, $j$, to which are connected the conductors of the electric circuit, J.

When it is desired to start the engine, the valves $b$, $c$, are closed, and a current of electric energy is switched into the units or resistance coils of the electric heater, whereby the coils, G, are heated on the passage of the current therethrough. The heat developed in said coils is communicated almost directly to the pipe, B, and the water in said pipe is thus raised in temperature. The hot water rises through the chamber, $a$, and thereby establishes a circulation of water in said chamber and the by-pass, and this circulation of heated water heats the walls of the cylinder to a proper temperature. If desired, however, the valves, $b$, $c$, may be adjusted to confine the heated water in the chamber, $a$, and around the cylinder, or said valves may be turned to certain positions which permit the heated water to circulate through the chamber, $a$, and the by-pass. After the cylinders shall have been heated to the desired temperature, the engine is started by admitting the charges of combustible vapor thereto, and at this time the electric current is switched off so as to throw the electric heater out of service. The explosions in the engine cylinder heat up the latter so that it becomes necessary to partially cool said cylinder, and at this time the valves, $b$, $c$, may be again adjusted to permit the pump, D, to force cold water through the pipes, B, C, and the chamber, $a$.

Having thus fully described the invention, what we claim as new, and desire to secure by Letters Patent is:

1. The combination of an internal combustion engine, the cylinder of which is jacketed to provide a chamber for the circulation of a cooling medium in contact with the walls of the engine cylinder, circulating pipes connected to said circulating chamber, a by-pass connected to the circulating pipes at the respective sides of said chamber of the engine cylinder, valves for controlling the flow of water through the circulating pipes and the chamber to the exclusion of the by-pass, said valves being operable to direct the flow of water through the by-pass and the chamber to the exclusion of the circulating pipes, and an externally positioned heater coöperating with one of said pipes for heating the water when it is directed to circulate through the by-pass and the chamber of said cylinder jacket.

2. The combination of the cylinder of an internal combustion engine having a chambered jacket, circulating pipes for establishing the circulation of a liquid in contact with the walls of said engine cylinder, a by-pass connected with said circulating pipes at the respective sides of said chambered jacket, three way valves positioned to direct the circulation of water through said pipes and the chambered jacket to the exclusion of the by-pass, said valves being operable to control the flow of water through the by-pass and the chambered jacket to the exclusion of the rest of the circulating pipes, and an external electric heater coöperating directly with said circulating pipes for heating the water when it is directed by said valves to circulate through the by-pass and into contact with the walls of the engine cylinder for heating the latter prior to starting the engine.

3. The combination of the cylinder of an internal combustion engine having a jacketed chamber, circulating pipes for establishing the circulation of a liquid in contact with the walls of said engine cylinder, a by-pass pipe connected with said circulating pipes at the respective sides of the jacketed chamber, valves positioned to control the flow of liquid through the circulating means and the jacketed chamber to the exclusion of the by-pass, said valves being operable to direct the flow of liquid through the by-pass and the jacketed chamber to the exclusion of said circulating pipes, and an electrically-operated heater comprising a plurality of resistance coils included in an electric circuit, said heater enveloping one of said circulating pipes for heating the water when it is directed to flow through the by-pass to the exclusion of the circulating pipes whereby the walls of the engine cylinder may be heated preliminary to starting the engine.

4. The combination of an internal combustion engine, the cylinder of which is provided with a water jacket, a system of piping for establishing the circulation of a liquid through the jacket and into contact with the walls of the engine cylinder, a by-pass connected to said system of circulating piping at the respective sides of the water jacket, three way valves positioned to direct the flow of liquid through the system of piping and the water jacket to the exclusion of the by-pass, said valves being operable to shut off the flow of liquid through the circulating pipes and to direct said liquid through the by-pass, and an electrically-operated heater comprising a group of resistance coils applied externally to said system of piping, said heater operating to heat the water when it is directed to circulate through the by-pass to the exclusion of the system of piping.

5. The combination of an internal combustion engine, the cylinder of which is provided with a water jacket, a cooling system for said engine cylinder, a by-pass pipe connected with said cooling system at the respective sides of said water jacket, valves positioned and operating to direct the flow of liquid through the cooling system to the exclusion of the by-pass, said valves being operable to direct the flow of liquid through the by-pass to the exclusion of the cooling system, and an electrically-operated heater engaging with a part of the cooling system externally thereof, said heater comprising a group of resistance coils each wound on a core of insulating material, whereby the heater is adapted to heat the water when it is directed to circulate through the by-pass to the exclusion of the cooling system.

In testimony whereof we have signed our names to this specification in the presence of two subscribing witnesses.

ABBOT A. LOW.
HARRY HERTZBERG.

Witnesses:
M. A. WARREN,
GEO. WELLING GIDDINGS.